No. 773,941. Patented November 1, 1904.

UNITED STATES PATENT OFFICE.

CARL KELLNER, OF VIENNA, AUSTRIA-HUNGARY.

MANUFACTURE OF CELLULOSE.

SPECIFICATION forming part of Letters Patent No. 773,941, dated November 1, 1904.

Application filed March 18, 1903. Serial No. 148,409. (No specimens.)

*To all whom it may concern:*

Be it known that I, CARL KELLNER, a subject of the Emperor of Austria-Hungary, residing at Vienna, in the Province of Lower Austria, in the Empire of Austria-Hungary, have invented certain new and useful Improvements in the Manufacture of Cellulose; and I do hereby declare the following to be a full, clear, and exact description of the invention, such as will enable others skilled in the art to which it appertains to make and use the same.

In the specification of my British Letters Patent No. 5,420, dated April 9, 1890, I have described a process for the production of cellulose by means of an electric current, wherein the reduced parts of plants that are to be opened out are subjected to the alternate action of the derivation products occurring in the electrolysis of an alkaline chorid in such a way that the solutions containing chlorin flowing from the anode-chambers oxidize the encrusting substances, (lignines,) and thereby convert them into bodies which are soluble in the solutions that are rich in alkaline hydroxids coming from the cathode-chambers. This process is really a continuous skeletonizing process, since the vegetable substances treated with the chlorin-containing solutions of the anode-chambers are repeatedly leached out by the solutions from the cathode-chambers. I have now succeeded in modifying and extending this process in such a way as entirely or almost entirely to save the cathode products occurring in the electrolysis of metallic chlorids and to utilize only the chlorin in gaseous form for the production of cellulose, whereby the cost of the process is considerably reduced, while an increased employment of the electrolytic treatment of metallic chlorids in the chemical industries is at the same time rendered practicable.

The treatment described in my aforesaid prior specification notwithstanding the acknowledged and important advantages of the electrolytic production of caustic alkalies and metals from their chlorin compounds has hitherto had but comparatively small use, because there was only small scope for the utilization of the chlorin produced. There is, however, a considerably better market for other products—as, for example, caustic alkalies and alkaline carbonates—than for the chlorin products hitherto obtained, such as chlorid and chlorate of lime and the like.

Now the portions of plants from which cellulose is to be produced are in accordance with this invention treated with water, or preferably with milk of lime or a very weak solution of an alkaline carbonate or hydroxid, and after the excess of liquid has been removed by means of a hydro-extractor or otherwise—as, for example, by pressing—the portions of plants under treatment are subjected to the action of the chlorid gas derived from the electrolysis of a metallic chlorid. This action, together with that of the heat of solution or of combination evolved by the absorption or combination of the chlorin gas by the liquids contained in the portions of plants under treatment causes the incrusting substances (lignines) to be oxidized so extensively as to convert them into substances which, while in many cases completely soluble in hot water, are in all cases completely soluble in very weak alkaline liquids.

In practically carrying out the new process herein described care must be taken that the parts of plants under treatment are promptly removed from the chlorinating vessel as soon as they have been completely permeated by chlorin gas, since the cellulose (vegetable fiber) itself would otherwise, in consequence of the above-mentioned processes, be converted into oxycellulose and simultaneously chlorinated in various stages. Such oxidized or chlorinated vegetable fibers are very brittle and are of little value for subsequent treatment.

The parts of plants under treatment after having been treated in the manner hereinbefore described are treated with cold or hot water, whereby the hydrochloric acid formed by the action of the chlorin is removed and the incrusting substances are converted into substances soluble in water. If the incrusting substances have not by the prior oxidation been completely converted into substances soluble in water, the portion of the oxidized or chlorinated incrusting substances which after treatment with water still remains with the cellulose can be separated therefrom in a bath of milk of lime or in a very weak solution of an alkaline hydroxid or carbonate in which the said portion insoluble in water dissolves with the production of a yellow-brown color. The said portion may in some instances be treated first with milk of lime and subsequently in an alkaline bath. The precise treatment adopted would depend on the nature of the vegetable substances in question. In the case of the majority of vegetable substances the bath may be at an ordinary temperature; but with many vegetable substances it must be heated. The residue, consisting only of nearly chemically-pure cellulose, (vegetable fiber,) is well washed with water and bleached, if desired, and is then dried and placed on the market or forwarded for or subjected to further treatment.

Since for the first impregnation of the parts of plants only water or milk of lime or at the most a one-half-per-cent. solution of an alkaline carbonate or hydroxid is necessary, while milk of lime only or at most a five-per-cent. solution of carbonate or hydroxid is sufficient for the "opening-out bath" that may be required after chlorinating and is capable of being used several times, it is obvious that the alkaline hydroxid or carbonate produced in the electrolytical separation of the alkaline chlorid is entirely or almost entirely removed and can be placed on the market as obtained, while a supply of the chlorin gas can at the same time be obtained sufficient for the oxidation of the incrusting substances of the parts of plants under treatment.

From the foregoing statements it will be seen that the vegetable fibers obtained by the new process herein described may really be considered as by-products of the electrolytic manufacture of alkalies from the chlorids.

It is obviously practicable to utilize the whole of the chlorin gas obtained in electrolytic processes in the manner hereinbefore described. For example, instead of an alkaline-chlorid solution a solution of chlorid of zinc or of some other metal can be electrolytically split up for the purpose of obtaining the cathode products and the chlorin gas can be utilized in the manner hereinbefore described, while the small quantity of alkali which may be necessary for impregnating and opening out the parts of plants for which lime does not suffice can easily be obtained.

The following data are given by way of example in order to illustrate more clearly the results obtained by my invention; but, as is well know to those conversant with the art, there is great lack of scientific knowledge as to the chemical reactions occurring in the production of cellulose, and, in fact, a large part of the knowledge which chemists possess on this subject is purely empyrical in its nature. One hundred parts, by weight, of air-dried pine-wood requires ten parts, by weight, of lime or 0.15 parts, by weight, of caustic soda, absorbs thirty-two parts, by weight, of chlorin, and requires for the second bath twenty parts, by weight, of lime or 0.30 parts, by weight, of caustic soda; loses in the first bath 0.4 parts, by weight, of its weight and produces fifty parts, by weight, of cellulose.

One hundred parts, by weight, of esparto requires twenty parts, by weight, of lime or 1.5 parts, by weight, of caustic soda, absorbs fifteen parts, by weight, of chlorin, and requires for the second bath twenty parts, by weight, of lime or three parts, by weight, of caustic soda; loses in the first bath 1.2 parts, by weight, of its weight and produces fifty-five parts, by weight, of cellulose.

As to current in the treatment, for example, of textile fibers (ramie) to obtain the theoretically-ascertained best results 4.5 ampere hours are required, and in the event lime-milk is employed 6.8 per cent. of caustic soda is obtained. In the event the weak solution of an alkaline carbonate or hydroxid is employed 2.3 per cent. of caustic soda is obtained. If jute is being treated to obtain the theoretically-ascertained best results 11.3 ampere hours are required, and if lime-milk be employed seventeen per cent. of caustic soda is obtained. If the weak solution of an alkaline carbonate or hydroxid be employed eight per cent. of caustic soda is obtained. The latter figures also hold true, in theory, in the treatment of esparto-grass. In like manner pine-wood requires 24.2 ampere hours and yields 36.3 per cent. or fifteen per cent. of caustic soda, accordingly as lime-milk or the weak solution of an alkaline carbonate of hydroxid be employed.

In practice the actual results obtained will be from seventy-six per cent. to ninety-eight per cent. of those expressed theoretically, dependent upon the character of electrolyzing apparatus employed.

I claim—

1. The process of producing cellulose which consists in saturating the portion of the plant to be treated with a suitable liquid, and then oxidizing the lignines and rendering them soluble in water or in a weak alkaline solution by means of chlorin gas, produced by the electrolysis of metallic chlorids in the presence of the material treated.

2. The process of producing cellulose which consists in subjecting the portion of the plant to be treated to the action of an alkaline solution, and then oxidizing the lignines and rendering them soluble in water or in a weak alkaline solution by means of chlorin gas, produced by the electrolysis of metallic chlorids in the presence of the material treated.

3. The process of producing cellulose which consists in subjecting the portion of the plant to be treated, the lignines of which have been rendered readily oxidizable, to the action of chlorin gas produced in the presence of the material treated by the electrolysis of metallic chlorids, whereby the cathode products resulting from the electrolysis of said metallic chlorids may be saved and utilized commercially.

In testimony that I claim the foregoing as my invention I have signed my name in presence of two subscribing witnesses.

CARL KELLNER.

Witnesses:
    JOSEF RUBURCH,
    ALVESTO S. HOGUE.